United States Patent
Yokoyama

(10) Patent No.: US 9,639,157 B2
(45) Date of Patent: *May 2, 2017

(54) DISPLAY DEVICE

(75) Inventor: Ryoichi Yokoyama, Kakogawa (JP)

(73) Assignee: Kyocera Corporation, Kyoto (JP)

( * ) Notice: Subject to any disclaimer, the term of this patent is extended or adjusted under 35 U.S.C. 154(b) by 148 days.

This patent is subject to a terminal disclaimer.

(21) Appl. No.: 13/982,135

(22) PCT Filed: Jan. 26, 2012

(86) PCT No.: PCT/JP2012/051627
§ 371 (c)(1),
(2), (4) Date: Jul. 26, 2013

(87) PCT Pub. No.: WO2012/102327
PCT Pub. Date: Aug. 2, 2012

(65) Prior Publication Data
US 2013/0307806 A1    Nov. 21, 2013

(30) Foreign Application Priority Data
Jan. 28, 2011   (JP) ................. 2011-016516

(51) Int. Cl.
*G06F 3/01*    (2006.01)
*G06F 3/041*   (2006.01)
*G06F 3/044*   (2006.01)

(52) U.S. Cl.
CPC .............. *G06F 3/016* (2013.01); *G06F 3/044* (2013.01); *G06F 3/0412* (2013.01)

(58) Field of Classification Search
CPC .................. G06F 3/016; G06F 3/044
See application file for complete search history.

(56) References Cited

U.S. PATENT DOCUMENTS

2008/0122315 A1   5/2008   Maruyama et al.
2011/0205173 A1*  8/2011   Arai .............................. 345/173

FOREIGN PATENT DOCUMENTS

| JP | 09167541 A   | 6/1997 |
| JP | 2003271074 A | 9/2003 |
| JP | 2005266890 A | 9/2005 |
| JP | 2008123453 A | 5/2008 |

OTHER PUBLICATIONS

International Search Report, PCT/JP2012/051627, Feb. 16, 2012, 1 pp.

* cited by examiner

*Primary Examiner* — Gerald Johnson
(74) *Attorney, Agent, or Firm* — Volpe and Koenig, P.C.

(57) ABSTRACT

A display device is disclosed. The display device includes first and second substrates, a display part, a vibrating body and a vibration transmission member. The first substrate includes a first inner primary surface and an outer primary surface opposing each other. The first substrate further includes a display region and an input region on the outer primary surface, and an input section. The second substrate includes a second inner primary surface that includes a facing region and a non-facing region. The facing region faces the first inner primary surface while the non-facing region does not face the first inner primary surface. The display part is located between the first substrate and the second substrate. The vibrating body is located in the non-facing region on the second substrate. The vibration transmission member is located between the first inner primary surface and the second inner primary surface.

7 Claims, 13 Drawing Sheets

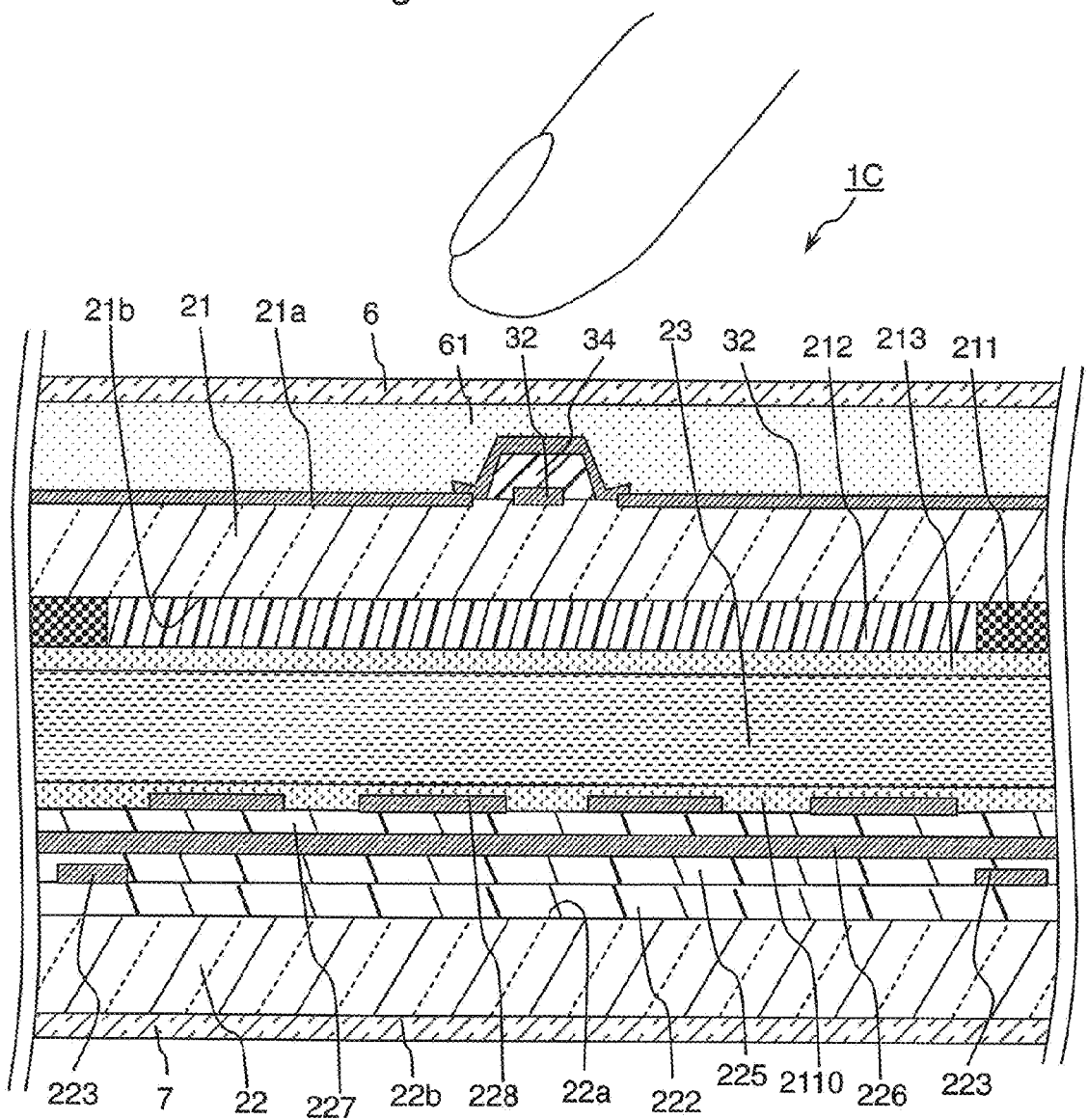

DISPLAY DEVICE

FIELD OF INVENTION

The present invention relates to a display device which can be used in a variety of applications such as mobile telephones, digital cameras, portable game consoles, and portable information terminals.

BACKGROUND

In recent years, there are known display devices which, when a user presses on a screen, cause the user to feel as if a pushbutton switch has been pressed (for example, in Japanese Laid-Open Patent Application Publication 2008-123453).

Such a display device has a touch panel, a display panel located on the rear surface of the touch panel and having a mutually facing upper substrate and lower substrate, and a vibrating body such as a piezoelectric element located between the touch panel and the upper substrate. In such display device, when a voltage is applied to the piezoelectric element, the piezoelectric element vibrates and, accompanying the vibration, a feeling of pressing is imparted to the user.

However, in the above-noted display device, when a vibrating body is located between the touch panel and the upper substrate, when the touch panel and display panel are fitted to one another, the spacing between the touch panel and the display panel tends to become large because of the thickness of the vibrating body. As a result, there is the problem of the overall thickness of the display device becoming large.

The present invention has been made in consideration of the above-noted problem, and has an object of making a display device thinner.

SUMMARY

The display device of the present invention a first substrate that includes a display region and an input region on an outer primary surface thereof, and provided with an input section for detecting an input location in the input region, a second substrate disposed, inner primary surfaces thereof and of the first substrate facing each other, display means disposed between the first substrate an the second substrate for displaying image information in the display region, a vibrating body provided on the second substrate for vibrating the input region of the first substrate, and a vibration-transmission member for transmitting vibration of the vibrating body from the second substrate to the first substrate, wherein the second substrate includes on the inner primary surface an facing region facing the inner primary surface of the first substrate and a non-facing region not facing the inner primary surface of the first substrate, and wherein the vibrating body is provided in the non-facing region.

According to the display device of the present invention, since the vibrating body is located on a first primary surface of the second substrate and in a non-display facing region, the vibrating body does not overlap with the first substrate when seen in a plan view. As a result, an increase in the thickness of the display device due to the thickness of the vibrating body is suppressed, and it is possible to achieve thinness.

BRIEF DESCRIPTION OF THE DRAWINGS

FIG. 13 is a cross-sectional view showing a display device of a fourth embodiment of the present invention.

DETAILED DESCRIPTION OF THE PREFERRED EMBODIMENTS

First Embodiment

Figure 1:
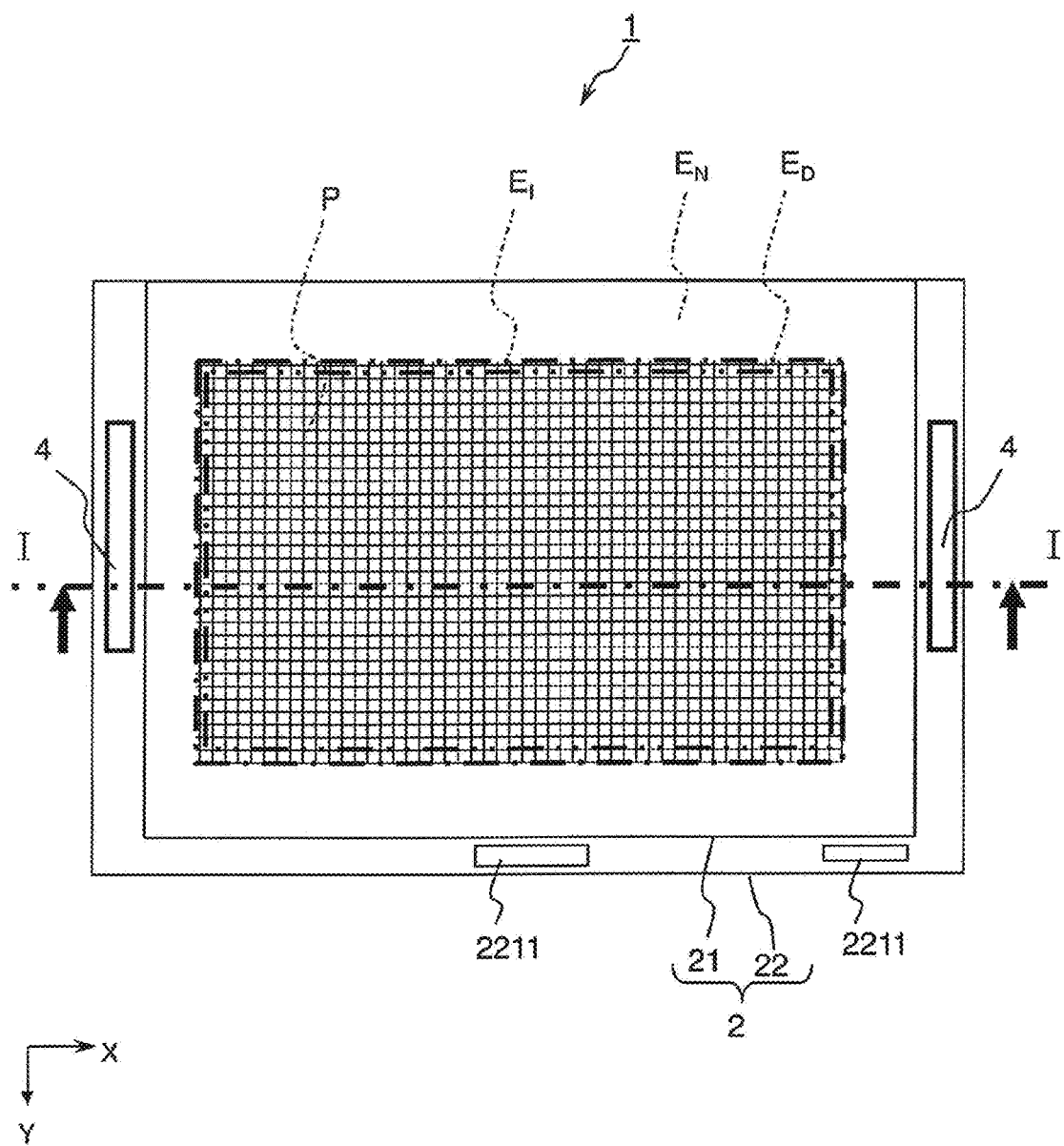
FIG. 1 is a plan view of a display device according to a first embodiment of the present invention.

A display device 1 according to the first embodiment of the present invention will be described, with references being made to FIG. 1 to FIG. 8.

The display device 1 according to the first embodiment shown in FIG. 1 to FIG. 8 includes a display panel 2, an input section 3 located on the display 2, a vibrating body 4 provided on the display panel 2, a light source device 5 emitting light toward the display panel 2, a first polarizing sheet 6 disposed on the input section 3, and a second polarizing sheet 7 disposed between the display panel 2 and the light source device 5.

The display panel 2, which is a display means, includes a first substrate 21, a second substrate 22 disposed to face the first substrate 21, a liquid crystal layer 23 located between the first substrate 21 and the second substrate 22, and a joining member 24, which is a vibrating transmission member, joining the first substrate 21 and the second substrate 22 so as to surround the liquid crystal layer 23.

The display panel 2 in the present embodiment is a liquid crystal display panel displaying image information in the display region $E_D$ using the liquid crystal layer 23. That is, in the display panel 2 in the present embodiment, by a display means that generates an electric field between signal electrodes 228 and a common electrode 226 to control the orientation of liquid crystal molecules in the liquid crystal layer 23, the transmissivity of light from the light source device 5 is adjusted for each pixel P, so as to display an image in the display region $E_D$.

Also, the display panel 2 in the present embodiment adopts so-called lateral electric field method, wherein an electric field is generated between signal electrodes 228 provided on one of a pair of substrates and a common electrode 226 to control the orientation of liquid crystal molecules in the liquid crystal layer 23. Although this embodiment adopts the lateral electric field method, this is not a restriction, and any method can be used. For example, vertical electric field method may be adopted.

The display means of the display panel 2 of the present invention is not restricted to using the liquid crystal layer 23. For example, it may be a display means that uses a light-emitting layer, such as a plasma, or electroluminescence.

The first substrate 21 includes a first primary surface 21a (outer primary surface) located on the input section 3 side thereof, and a second primary surface 21b (inner primary surface) located on the side opposite from the first primary surface 21a. The first primary surface 21a and the second primary surface 21b of the first substrate 21 include a display region $E_D$ constituted by a plurality of pixels P, a non-display region $E_N$ located outside the display region $E_D$, and an input region $E_I$ located on the display region $E_D$. The material of the first substrate 21 can be a translucent material, for example, glass, plastic, or the like.

A light-blocking film 211, color filters 212, and a first orientation film 213 are provided on the second primary surface 21b of the first substrate 21.

The light-blocking film 211 is provided in, for example, a matrix pattern on the second primary surface 21b of the first substrate 21. In this case, the light-blocking film 211 is provided along the periphery of each of the pixels P. The material for the light-blocking film 211 can be, for example, a resin to which a dye or pigment having a high degree of light blocking (for example, black) is added or a metal such as chromium. Although the light-blocking film 211 in the present embodiment is formed as a matrix pattern, this is not a restriction.

The color filters 212 have function of passing, of visible light, light of only a specific wavelength. The color filters 212 are provided on the second primary surface 21b of the first substrate 21, at the locations of each pixel P. Each color filter 212 has one of the colors red (R), green (G), and blue (B). The color filters 212 are not restricted to the above-noted colors, and may have, for example, colors such as yellow (Y) and white (W). The material of the color filters 212 can be a resin to which, for example, a dye or pigment has been added.

The first polarizing film 213 has function of controlling the orientation of liquid crystal molecules of the liquid crystal layer 23. The first polarizing film 213 is provided on the light-blocking film 211 and the color filters 212. The material of the first polarizing film 213 can be a resin such as a polyimide resin.

Although the light-blocking film 211 and the color filters 212 are provided on the second primary surface 21b of the first substrate 21 of the display device 1, this is not a restriction. That is, the light-blocking film 211 and the color filters 212 may be provided on the second substrate 22.

The second substrate 22 includes a first primary surface 22a as an inner primary surface facing the second primary surface 21b of the first substrate 21 and a second primary surface 22b as an outer primary surface located on the side opposite from the first primary surface 22a. The material of the second substrate 22 is the same as that of the first substrate 21.

Also, the first primary surface 22a of the second substrate 22 includes a facing region $E_O$ that faces the second primary surface 21b of the first substrate 21 and a non-facing region $E_{NO}$ that does not face the second primary surface 21b of the first substrate 21. The facing region $E_O$ is a region that includes a display-facing region $E_{FD}$ facing the display region $E_D$ of the first substrate 21.

Arranged on the first primary surface 22a of the second substrate 22 are a plurality of a gate interconnects 221, a first insulating film 222 provided on the first primary surface 22a so as to cover the plurality of gate interconnects 221, a plurality of source interconnects 223 provided on the first insulating film 222 so as to intersect with the plurality of gate interconnects 221, thin-film transistors 224, a second insulating film 225 provided on the first insulating film 222 so as to cover the plurality of source interconnects 223, a common electrode 226 (display electrode) provided on the second insulating film 225, a third insulating film 227 provided on the second insulating film 225 so as to cover the common electrode 226, a plurality of signal electrodes 228 (display electrodes) provided on the third insulating film 227, display interconnects 229 electrically connected to the gate interconnects 221, a source interconnect 223, or the common electrode 226, a second orientation film 2210 provided on the signal electrodes 228 and the third insulating film 227, and a driver IC 2211 connected to the display interconnects 229.

Figure 5:
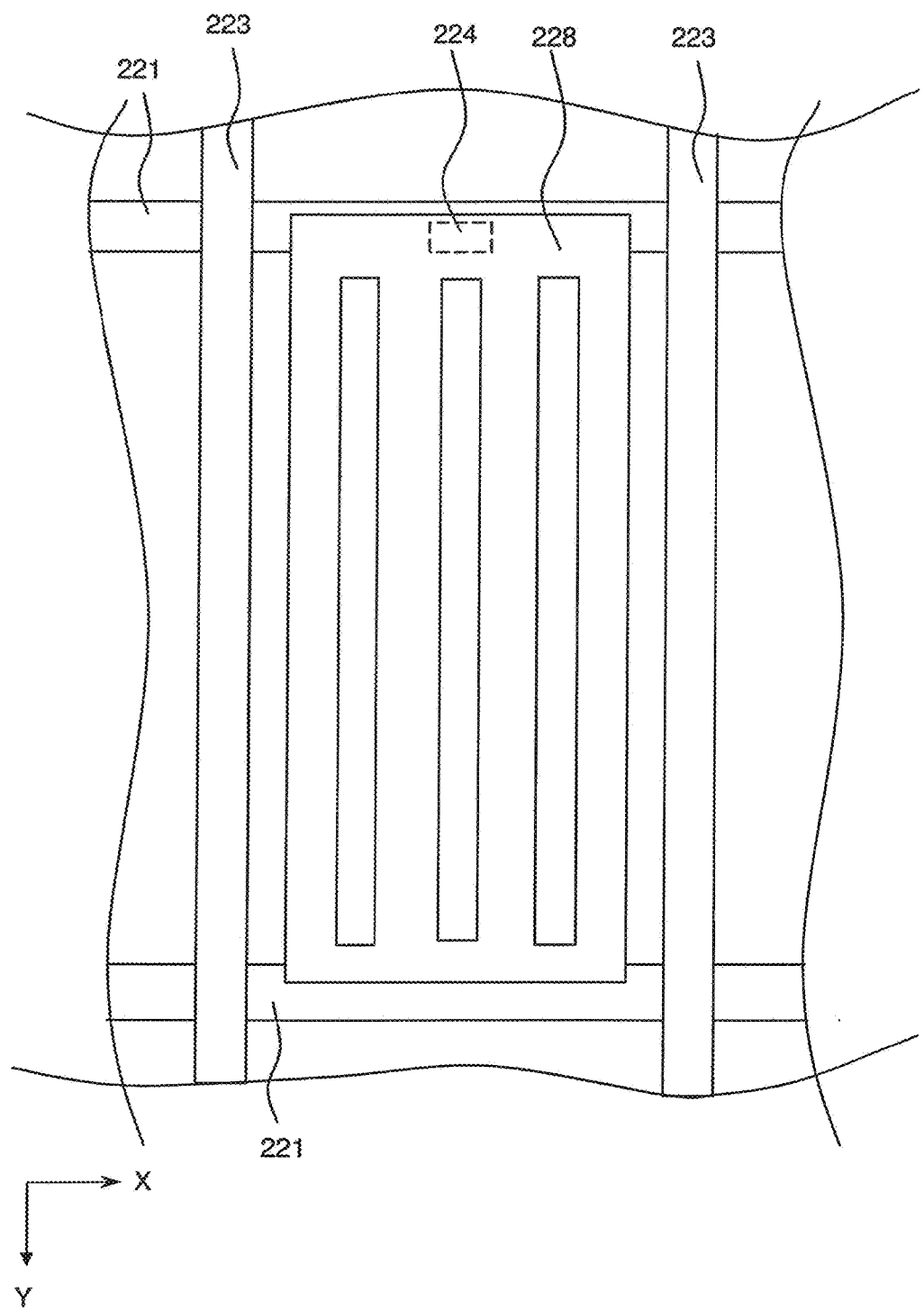
FIG. 5 is a plan view showing the electrodes and interconnects of the second substrate.

The gate interconnects 221 have function of applying a voltage supplied from the driver IC 2211 to the thin-film transistors 224. As shown in FIG. 5, the gate interconnects 221 extend in the X direction on the first primary surface 22a of the second substrate 22. The plurality of gate interconnects 221 are arranged in the Y direction. The gate interconnects 221 are formed from a material having electrical conductivity, such as aluminum, molybdenum, titanium, neodymium, chromium, copper, or alloys containing these.

A method for forming the gate interconnects is as follows.

First, using sputtering method, vapor deposition method, or chemical vapor deposition method, a metal material is formed as a film on the first primary surface 22a of the second substrate 22. A photosensitive resin is coated onto this metal film, and then the photosensitive resin coated is subject to an exposure process and development process, so as to form a pattern of a desired configuration in the photosensitive resin. Next, the metal film is etched with a chemical fluid to form the metal film into a desired configuration, after which the coated photosensitive resin is peeled away. In this manner, the gate interconnects can be formed by deposition and patterning of a metallic material.

The first insulating film 222 has the function of electrically insulating the gate interconnects 221 and the source interconnects 223. The first insulating film 222 is formed from a material having insulating properties, such as silicon nitride or silicon oxide.

The source interconnects 223 have the function of applying a signal voltage supplied from the driver IC 2211 to the signal electrodes 228, via the thin-film transistors 224. As shown in FIG. 5 the source interconnects 223 extend in the Y direction. The plurality of source interconnects 223 are arranged in the X direction. Although the source interconnects 223 in the present embodiment are formed in straight lines, they may be formed bent. The source interconnects 223 may be made of the same material to the gate interconnects 221. The source interconnects 223 may be formed by the same method to the gate interconnects 221.

The thin-film transistors 224 each include: a semiconductor layer made of amorphous silicon, polysilicon, or the like; a source electrode provided on the semiconductor layer and connected to source interconnects 223, and a drain electrode. In the thin-film transistors 224, the resistance of the semiconductor layer between the source electrode and the drain electrode changes in response to a voltage applied to the semiconductor layer via a gate interconnect 221, so as to control the write or no-write of an image signal to the signal electrodes 228.

The second insulating film 225 has the function of electrically insulating the source interconnects 223 and the common electrode 226. The second insulating film 225 is formed by a material having insulating properties, such as a resin or the like.

The third insulating film 227 has the function of electrically insulating the signal electrodes 228 and the common electrode 226. The third insulating film 227 may be formed from the same material to that of the first insulating film 222.

The common electrode 226 has the function of generating an electric field between itself and the signal electrodes 228 by application thereto of a voltage from the driver IC 2211. The common electrode 226 is provided on the second insulating film 225.

The common electrode 226 is formed from a translucent and electrically conductive material, such as ITO (indium tin oxide), IZO (indium zinc oxide), ATO (antimony tin oxide), AZO (Al-doped zinc oxide), tin oxide, zinc oxide, or an electrically conductive polymer.

The signal electrodes 228 have the function of generating an electric field between them and the common electrode 226 by a voltage supplied from the driver IC 2211. The plurality of signal electrodes 228 are provided on the third insulating film 227. Although the signal electrodes 228 in the present embodiment are formed rectangularly, the signal electrodes 228 may be formed bent. The signal electrodes 228 may be formed from the same material as that of the common electrode 226.

Although in the present embodiment the common electrode 226, the third insulating film 227 and the signal electrodes 228 are provided in this order on the second primary surface of the second substrate 22, followed by, this is not a restriction. That is, the common electrode 226 may be formed on the signal electrodes 228 with the third insulating film 227 interposed therebetween, thereby providing the signal electrodes 228, the third insulating film 227 and the common electrode 226 in this order.

The display interconnects 229 are interconnects to which voltages for driving the display panel 2 are applied. A plurality of display interconnects 229 are provided on the first primary surface 22a of the second substrate 22. The display interconnects 229 are connected, for example, to the gate interconnects 221, the source interconnects 223 or the common electrode 226.

The display interconnects 229 are formed from an electrically conductive material such as aluminum, molybdenum, titanium, neodymium, chromium, copper, silver, gold, or alloys containing these. The method of forming the display interconnects 229 can be the same method as for forming the gate interconnects 221.

The driver IC 2211 has the function of controlling the drive of the gate interconnects 221, the source interconnects 223, and the like. The driver IC 2211 is located in the non-facing region $E_{NO}$. The display interconnects 229 are connected to the driver IC 2211.

The second orientation film 2210 has the function of controlling the orientation of liquid crystal molecules of the liquid crystal layer 23. The second orientation film 2210 is provided on the signal electrodes 228 and the third insulating film 227.

The input section 3 is provided on the first primary surface 21a of the first substrate 21. In the present embodiment, the input section 3 is provided on the first primary surface 21a of the first substrate 21 with a sealing member T interposed therebetween. The sealing member T is provided so as to surround the display region $E_D$ of the first primary surface 21a of the first substrate 21. The material of the sealing member T can be a resin having adhesiveness.

In the display device 1, because the vibrating bodies 4 are not provided on the first primary surface 21a of the first substrate 21 but on the first primary surface 22a of the second substrate 22, the restriction of the region for forming the sealing member T by the vibrating bodies 4 is suppressed. As a result, the joining strength between the input section 3 and the display panel 2 can be improved, and it is easier to transmit the vibration of the vibrating bodies 4 to the input region $E_I$.

The input section 3 in the present embodiment adopts the capacitive method of detection. Although the input section 3 in the present embodiment adopts the capacitive method, this is not a restriction and any method can be used. For example, a resistive-film method, a surface acoustic wave method, an infrared method, or an electromagnetic induction method may be adopted.

Figure 7:
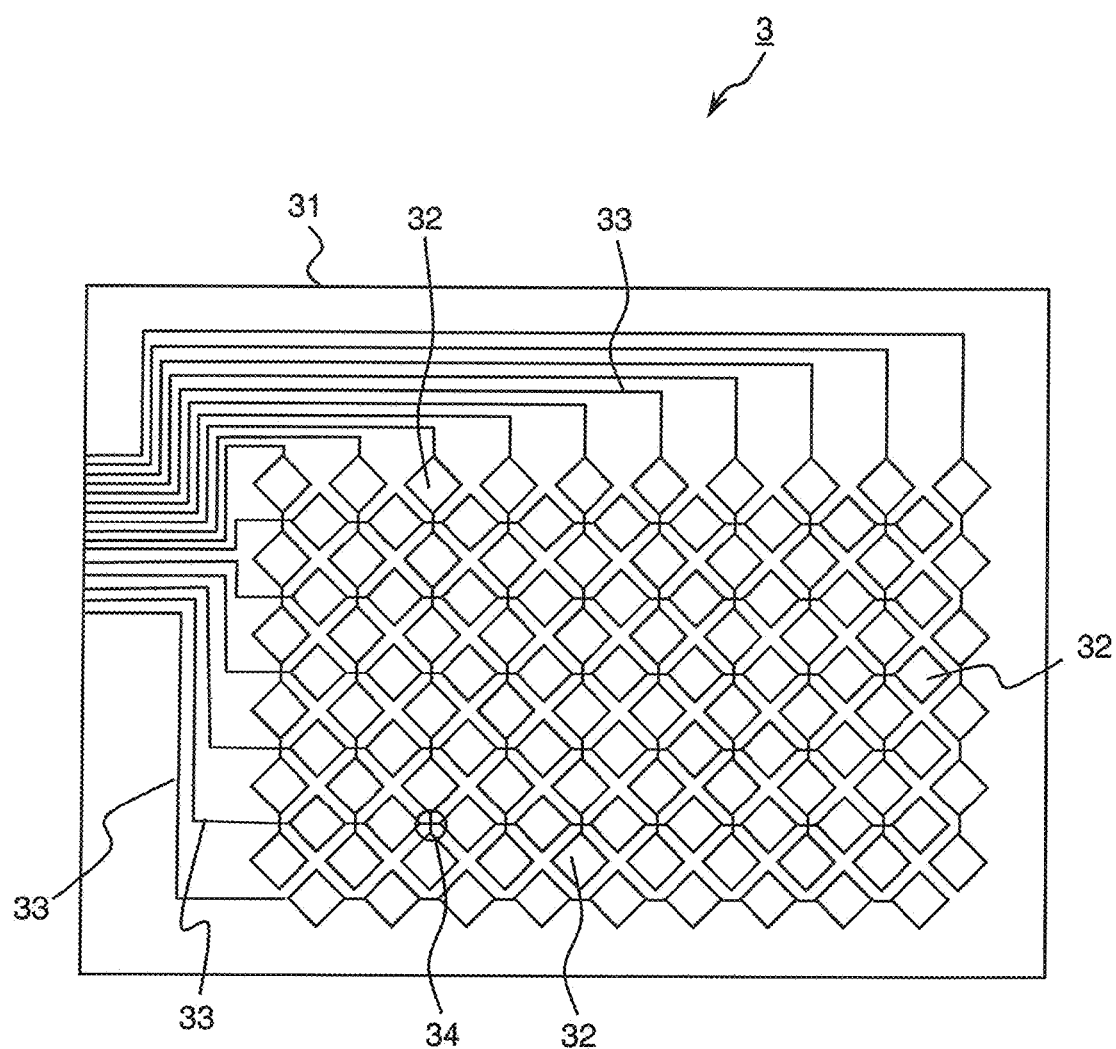
FIG. 7 is a plan view showing the input section.
Figure 8:
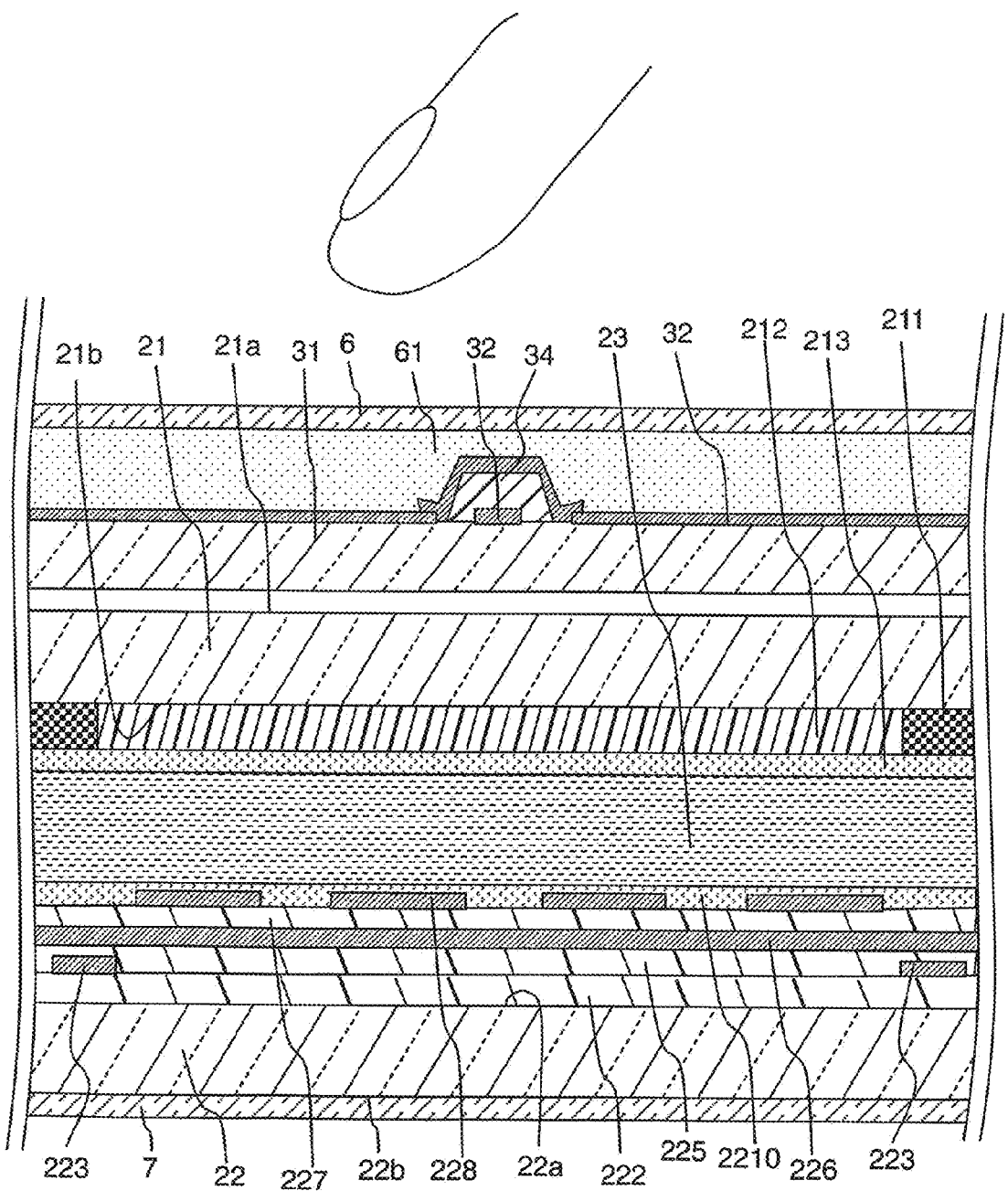
FIG. 8 is a cross-sectional view showing a part of the display device of FIG. 1.

The input section 3, as shown in FIG. 7, includes an input section substrate 31, a plurality of detection electrodes 32 arranged along the X and Y directions on the input section substrate 31, a plurality of detection interconnects 33 connected to the detection electrodes 32, and insulators 34 located at the intersections of the detection electrodes 32.

The input section substrate 31 is formed from a translucent material such as glass, quartz, rock crystal, sapphire, or plastic.

The detection electrodes 32 are located on the input section substrate 31 in a region corresponding to the input region $E_I$. A plurality of diamond-shaped detection electrodes 32 connected in the Y direction are arranged in the X direction. A plurality of diamond-shaped detection electrodes 32 connected in the X direction are arranged in the Y direction. The detection electrodes 32 arranged in the X direction and the detection electrodes 32 arranged in the Y direction intersect in a plan view, and insulators 34 are located at the intersection regions thereof. The detection electrodes 32 may be formed from the same material as the common electrode 226.

The detection interconnects 33 have the function of applying a voltage supplied from an input section driver (not shown) to the detection electrodes 32. The detection interconnects 33 are provided on the input section substrate 31 in a region corresponding to the non-display region $E_N$. The material of the detection interconnects 33 can be one with electrical conductivity, for example, ITO, tin oxide, aluminum, an aluminum alloy, copper, a copper alloy, gold, a gold alloy, silver, or a silver alloy, or the like.

The insulators 34 have the function of electrically insulating between intersecting detection electrodes 32. The insulators 34 are provided on the input section substrate 31 so as to cover a part of the detection electrodes 32. The material of the insulators 34 can be a translucent material with insulating properties, for example, an acrylic resin or the like.

Next, the input location detection principle of the input section 3 will be described.

In the input section 3, since neighboring detection electrodes 32 are disposed adjacent to one another, floating capacitance occurs between neighboring detection electrodes 32. That is, in the input section 3, a plurality of floating capacitive elements is disposed in a matrix pattern. When a voltage is applied to the plurality of detection electrodes 32, a charge is accumulated in each floating capacitive element. In this condition, when an input means of conductive body such as a user's finger or a stylus comes into direct or indirect contact with input region $E_I$ of the first substrate 21, there is a change in the floating capacitance of the floating capacitive elements of the input section existing at the region which the input means comes contact with or comes closer to the input section. When this occurs, the charges accumulated in the floating capacitive elements existing at the contact part also change. As a result, the voltage at a plurality of detection electrodes 32 existing in the contact part also changes. This voltage change in the detection electrode 32 is read by the input section driver (not shown) as detection means. If the voltage change read by the input section driver exceeds a prescribed value, the input section driver recognizes the detection electrodes 32 at which there was a change of voltage exceeding the prescribed value, and recognizes the intersecting part at the recognized plurality of detection electrodes 32 as the input location.

Figure 2:
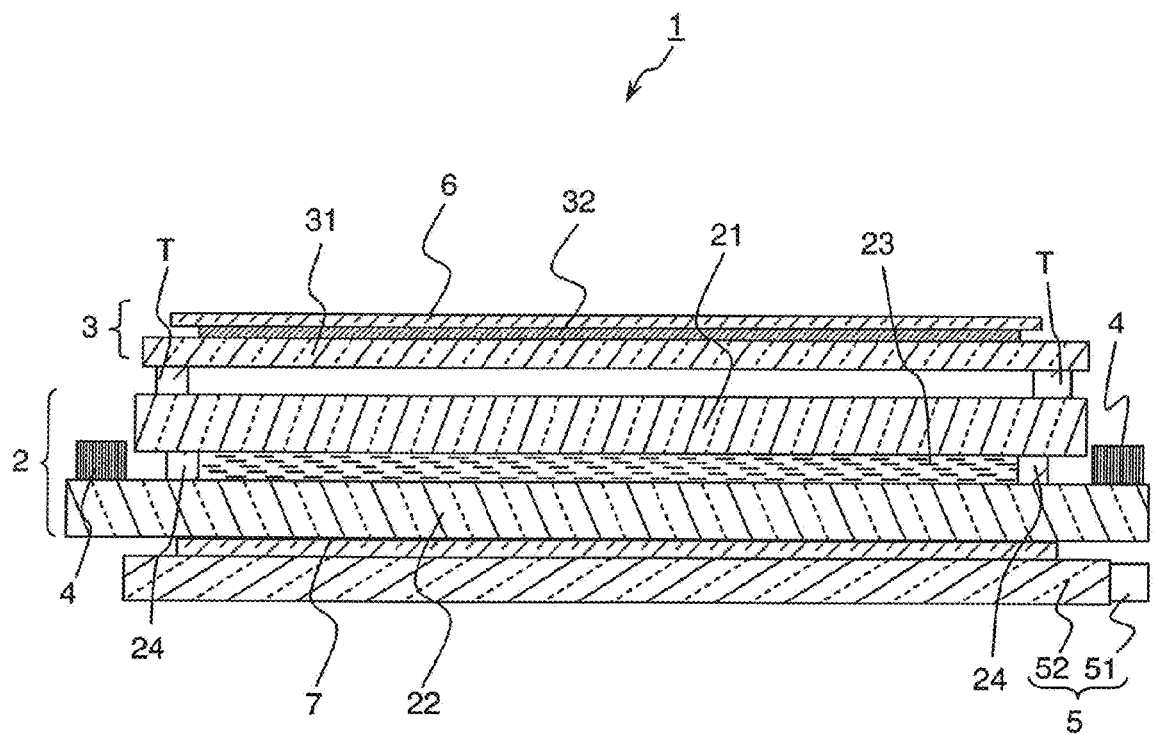
FIG. 2 is a cross-sectional view along the line I-I in FIG. 1.
Figure 3:
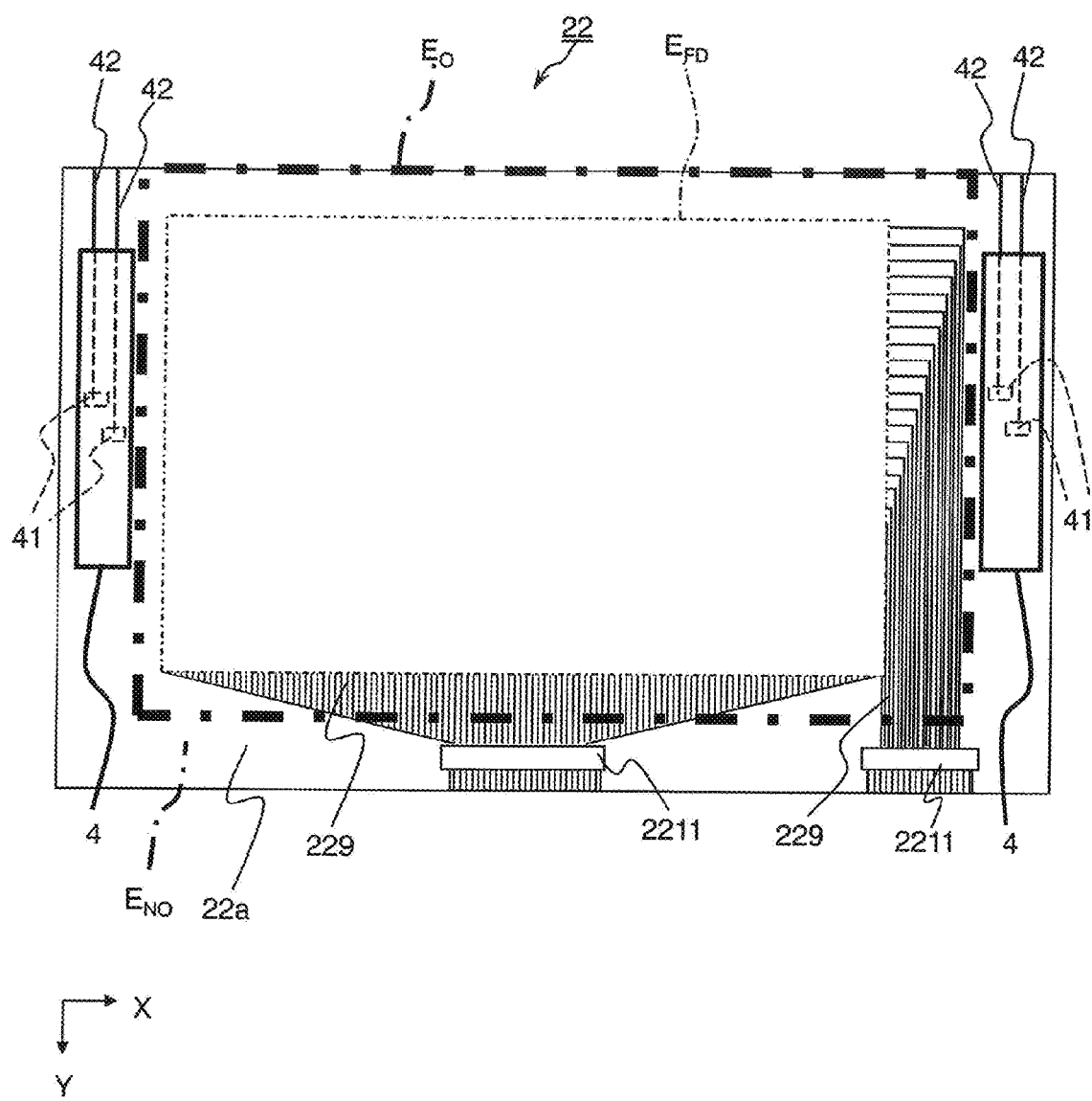
FIG. 3 is a plan view showing the second substrate.
Figure 4:
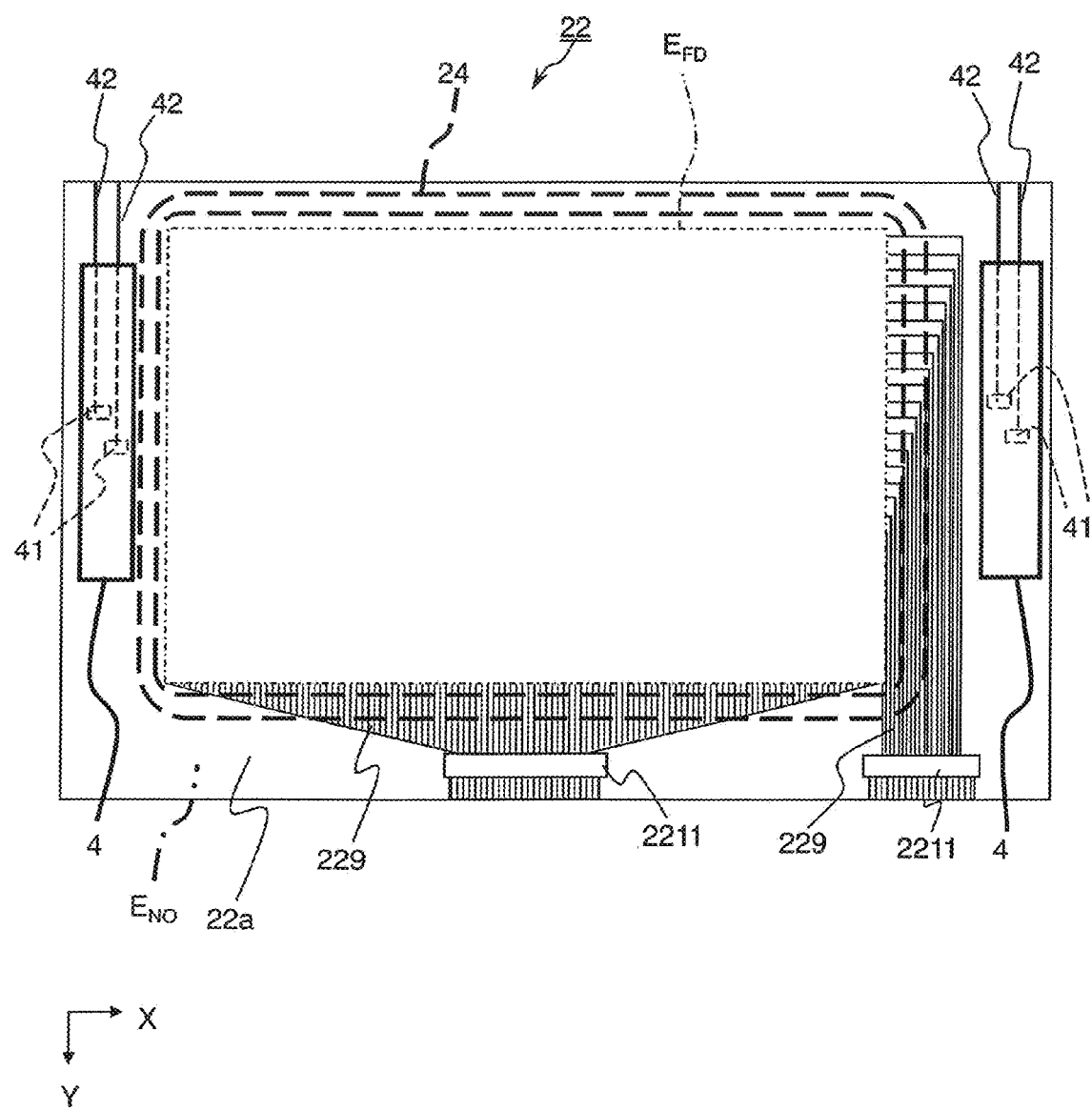
FIG. 4 is a plan view showing the location of the joining member on the second substrate.

The vibrating bodies 4 have the function of causing the input region $E_I$ to vibrate in response to pressure by input means such as the finger of a user. The vibrating bodies 4, as shown in FIG. 2 to FIG. 4, are provided on the first primary surface 22$a$ of the second substrate 22 of the display panel 2. The vibrating bodies 4 are located in the non-facing region $E_{NO}$ of the first primary surface 22$a$.

The shape of the vibrating bodies 4 is, for example, rectangular when seen in a plan view. The long sides of the vibrating bodies 4 in the present embodiment are provided along short sides of the second substrate 22.

Also, as shown in FIG. 3, the vibrating bodies 4 are located in a region of the non-facing region $E_{NO}$ along a short side of the first substrate 21. Although in this embodiment the vibrating bodies 4 are provided in the non-facing region $E_{NO}$ along a short side of the first substrate 21, this is not a restriction. For example, the vibrating bodies 4 may be provided in the non-facing region $E_{NO}$ along a long side of the first substrate 21.

Although there are two vibrating bodies 4 provided in the present embodiment, there is no particular restriction regarding the number of vibrating bodies 4.

Electrode terminals 41 are provided on the surfaces, facing the first primary surface 22$a$, of the vibrating bodies 4. Vibrating body interconnects 42 are connected to the electrode terminals 41, via an electrically conductive joining member. The material of the electrically conductive joining member can be a metal such as aluminum, gold, tin, solver, palladium, copper, and nickel, or an alloy including these, or a resin including metal particles.

The vibrating body interconnects 42 have the function of applying a voltage supplied from a power supply to the vibrating bodies 4. The vibrating body interconnects 42 are provided on the first primary surface 22$a$ of the second substrate 22 in a region that excludes the display facing region $E_{FD}$. The material of the vibrating body interconnects 42 can be the same as the display interconnects 229.

In the display device 1, since the vibrating bodies 4 are located in the non-facing region $E_{NO}$ on the first primary surface 22$a$ of the second substrate 22, the vibrating bodies 4 do not overlap with the first substrate 21 when seen in a plan view. As a result, an increase in the thickness of the display device 1 by the thickness of vibrating bodies 4 is suppressed, and the display device 1 is made thin.

In the display device 1, the vibrating bodies 4 are located entirely within the non-facing region $E_{NO}$. As a result, compared with the case in which a part of the vibrating bodies 4 protrudes outside from the edge of the second substrate 22, it is possible to make the overall outside region of the display device 1 smaller.

Since the vibrating body interconnects 42 and the display interconnects 229 are provided on the same plane of the second substrate 22 (first primary surface 22$a$), when the vibrating body interconnects 42 are made of the same material as the display interconnects 229, it is possible to form the vibrating body interconnects 42 and the display interconnects 229 using the same deposition process and the same patterning process. That is, since the vibrating body interconnects 42 and the display interconnects 229 are formed in the same process, it is possible to simplify the manufacturing process and improve productivity.

The voltage applied to cause the vibrating bodies 4 is larger than the voltage applied to the display interconnects 229 from the driver IC 2211. For this reason, the electromagnetic waves generated by the voltage applied to the vibrating bodies 4 affect the signal that is transmitted from the driver IC 2211 to the display interconnects 229 as noise, so that the image display might be affected.

In contrast, in the display device 1, the vibrating bodies 4 and the vibrating body interconnects 42 are located in the non-facing region $E_{NO}$ along short sides of the first substrate 21, and the driver IC 2211 is located in the non-facing region $E_{NO}$ along a long side of the first substrate 21. As a result, it is possible to establish separation between the vibrating bodies 4 and the vibrating body interconnects 42 and driver IC 2211, and it is possible to suppress the influence on the driver IC 2211 of the voltage applied to the vibrating bodies 4.

Figure 6:
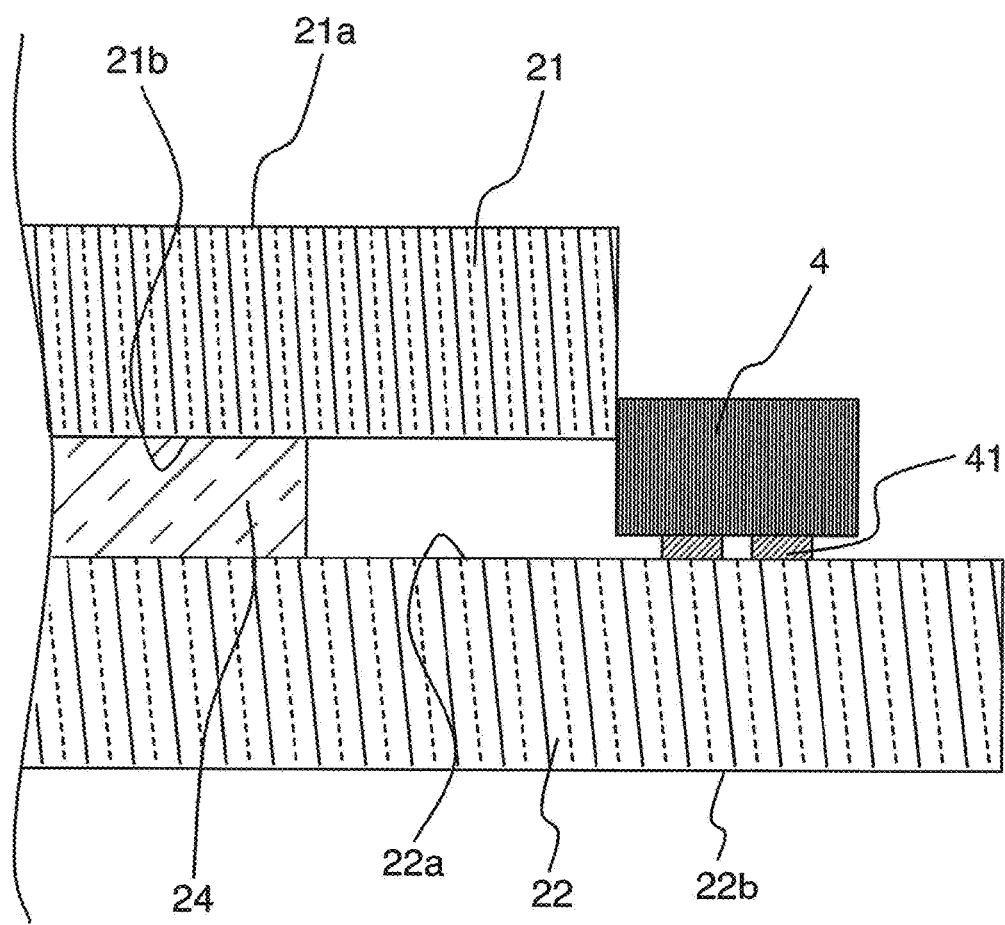
FIG. 6 is a cross-sectional view showing a variation example of the display device of FIG. 1.

As shown in FIG. 6, the vibrating bodies 4 may be made to be in contact with the first substrate 21. By doing this, the vibration of the vibrating bodies 4 located on the first primary surface 22$a$ of the second substrate 22 is easily transmitted to the first substrate 21.

The vibrating bodies 4 in the present embodiment are piezoelectric elements using the so-called piezoelectric effect to convert a force applied thereto to a voltage and convert a voltage applied thereto via the electrode terminals 41 to a force (vibration). Although the vibrating bodies 4 in the present embodiment are bimorph piezoelectric elements constituted by a plurality of piezoelectric bodies adhered together, this is not a restriction, and they may be monomorph piezoelectric elements. By applying a differential voltage to a plurality of piezoelectric bodies of a bimorph piezoelectric element, the piezoelectric elements 4 use the fact that, because the expansion and contraction directions of plurality of piezoelectric bodies are in opposition, warping occurs of the piezoelectric elements 4, to cause vibration of the piezoelectric elements 4.

Although in the present embodiment the description has been for an example in which the vibrating bodies 4 are implemented by piezoelectric elements, this is not a restriction, and, for example, implementation may be done by electromagnetic vibrating bodies, or a motor or the like.

The liquid crystal layer 23 is provided between the first substrate 21 and the second substrate 22. The liquid crystal layer 23 includes liquid crystal molecules of a nematic liquid crystal, a cholesteric liquid crystal, or the like.

The joining member 24 has the function of adhering together the first substrate 21 and the second substrate 22. The joining member 24 is provided between the first substrate 21 and the second substrate 22 so as to surround the display region $E_D$. The joining member 24 is formed from a resin or the like having adhesiveness. The joining member 24 in the present embodiment has the function of a vibration-transmitting member for transmitting the vibration of the vibrating bodies 4 to the input region $E_I$.

Although the joining member 24 is used in the present embodiment as a vibration-transmission member, this is not a restriction. For example, a separate vibration-transmission member may be provided between the first substrate 21 and the second substrate 22 so as to be in contact with both. In this case, when a material having a greater hardness than that of the material of the joining member 24 is used in the vibration-transmission member, the transmission of vibration of the vibrating bodies 4 to the input region $E_I$ is facilitated.

The light source device 5 has the function of emitting light directed toward the display panel 2. The light source device 5 includes a light source 51 and a light-guiding sheet 52. In the light source device 5 in the present embodiment, although the light source 51 uses a point light source such as an LED, a line light source such as a cold cathode tube may be used.

The first polarizing sheet 6 has the function of selectively passing light of a prescribed oscillation direction. The first polarizing sheet 6 is provided on the input section 3 with an adhesive 61 interposed therebetween. Although in the present embodiment the first polarizing sheet 6 is located on the input section 3, this is not a restriction. For example, it may be provided between the first primary surface 21a of the first substrate 21 and the input section 3.

The second polarizing sheet 7 has the function of selectively passing light of a prescribed vibration direction. The second polarizing sheet 7 is located on the second primary surface 22b of the second substrate 22.

Second Embodiment

Figure 9:
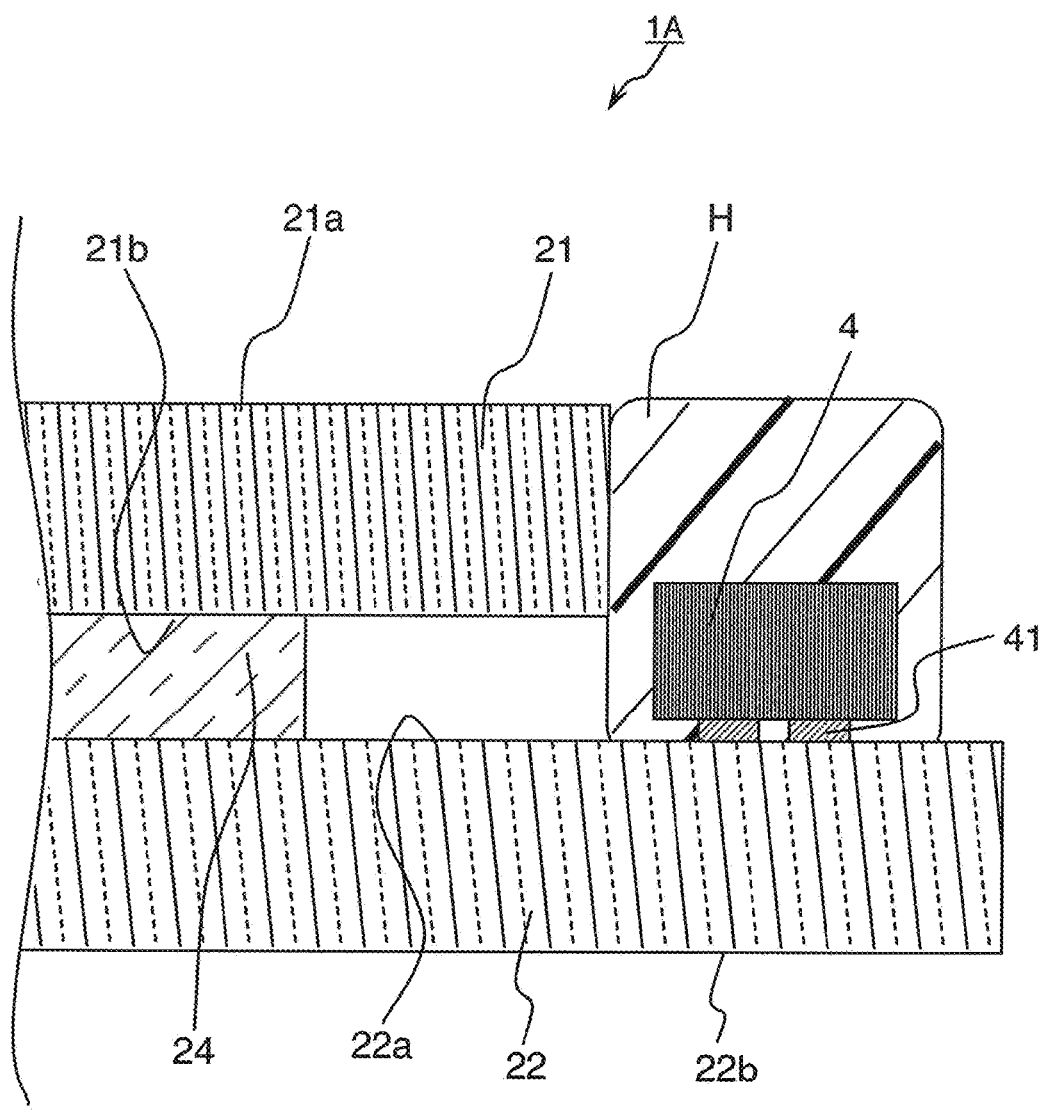
FIG. 9 is a cross-sectional view showing the main part of a display device according to a second embodiment of the present invention.
Figure 10:
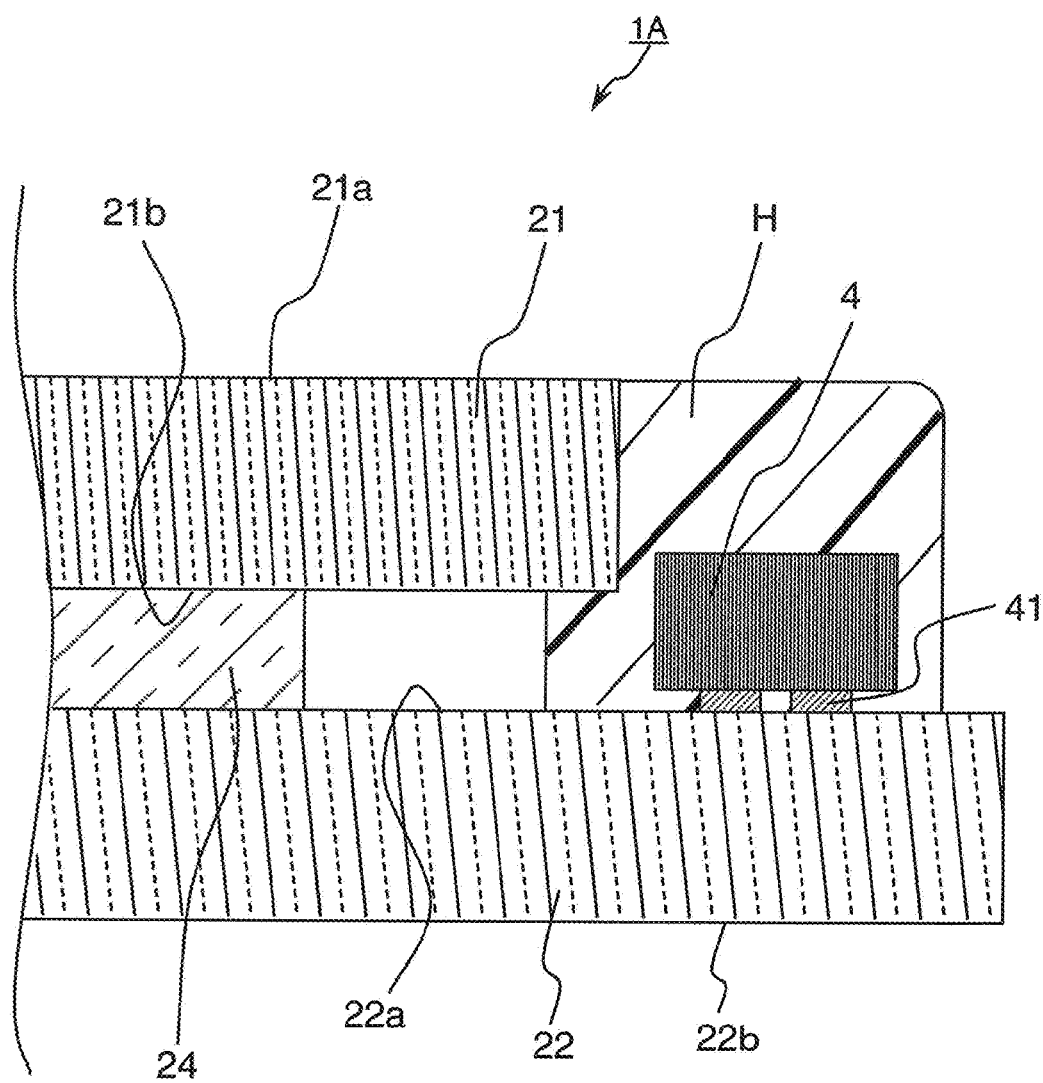
FIG. 10 is a cross-sectional view showing a variation example of the display device of FIG. 9.
Figure 11:
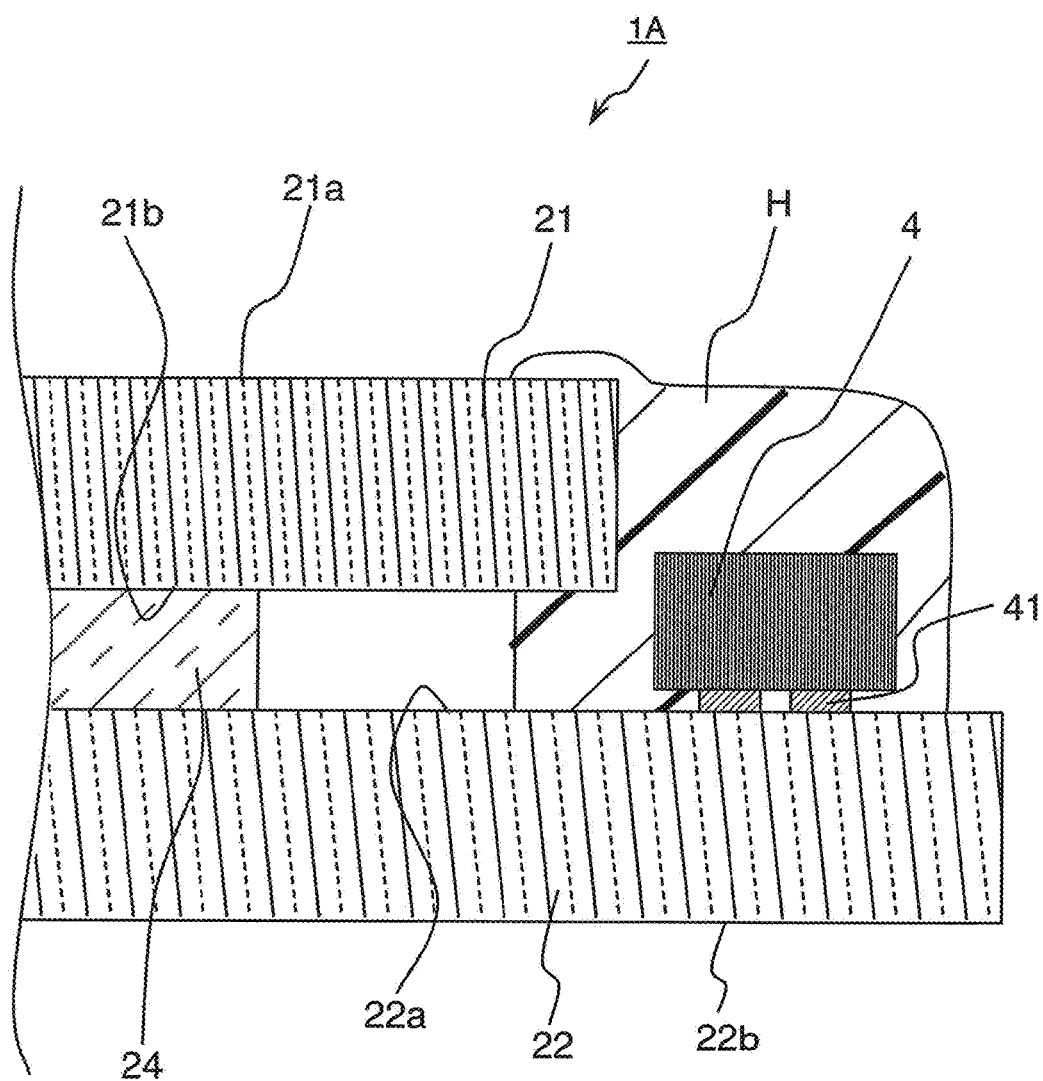
FIG. 11 is a cross-sectional view showing a variation example of the display device of FIG. 9.

FIG. 9 to FIG. 11 show the main part of a display device 1A of the second embodiment.

The display device 1A differs from the display device 1 in that the vibrating bodies 4 are covered by a protective member H.

The protective member H has the function of protecting the vibrating bodies 4 from shock and dust and the like. The protective member H covers at least a part of the vibrating bodies 4. The material of the protective member H is a resin such as an epoxy resin.

The protective member H is in contact with the first substrate 21. In FIG. 9, the protective member H is in contact at a side surface of the first substrate between the first primary surface 21a and the second primary surface 21b.

In the display device 1A, because the protective member H makes contact with the side surface of the first substrate 21, the transmission of the vibration of the vibrating body 4 located on the second primary surface 22a of the second substrate 22 to the input region 3 is facilitated.

In FIG. 10, the protective member H is in contact with the second primary surface 21b of the first substrate 21. Since the protective member is in contact not with the first primary surface 21a of the first substrate 21, but with the second primary surface 21b, the protective member H is placed between the first substrate 21 and the second substrate 22, and an increase in the thickness of the display device 1A can be suppressed by the protective member H.

In FIG. 11, the protective member H is in contact with the first primary surface 21a, the second primary surface 21b, and the side surface of the first substrate 21. As a result, the transmission of the vibration of the vibrating body 4 located on the second primary surface 22a of the second substrate 22 to the input region $E_I$ is further facilitated.

Third Embodiment

Figure 12:
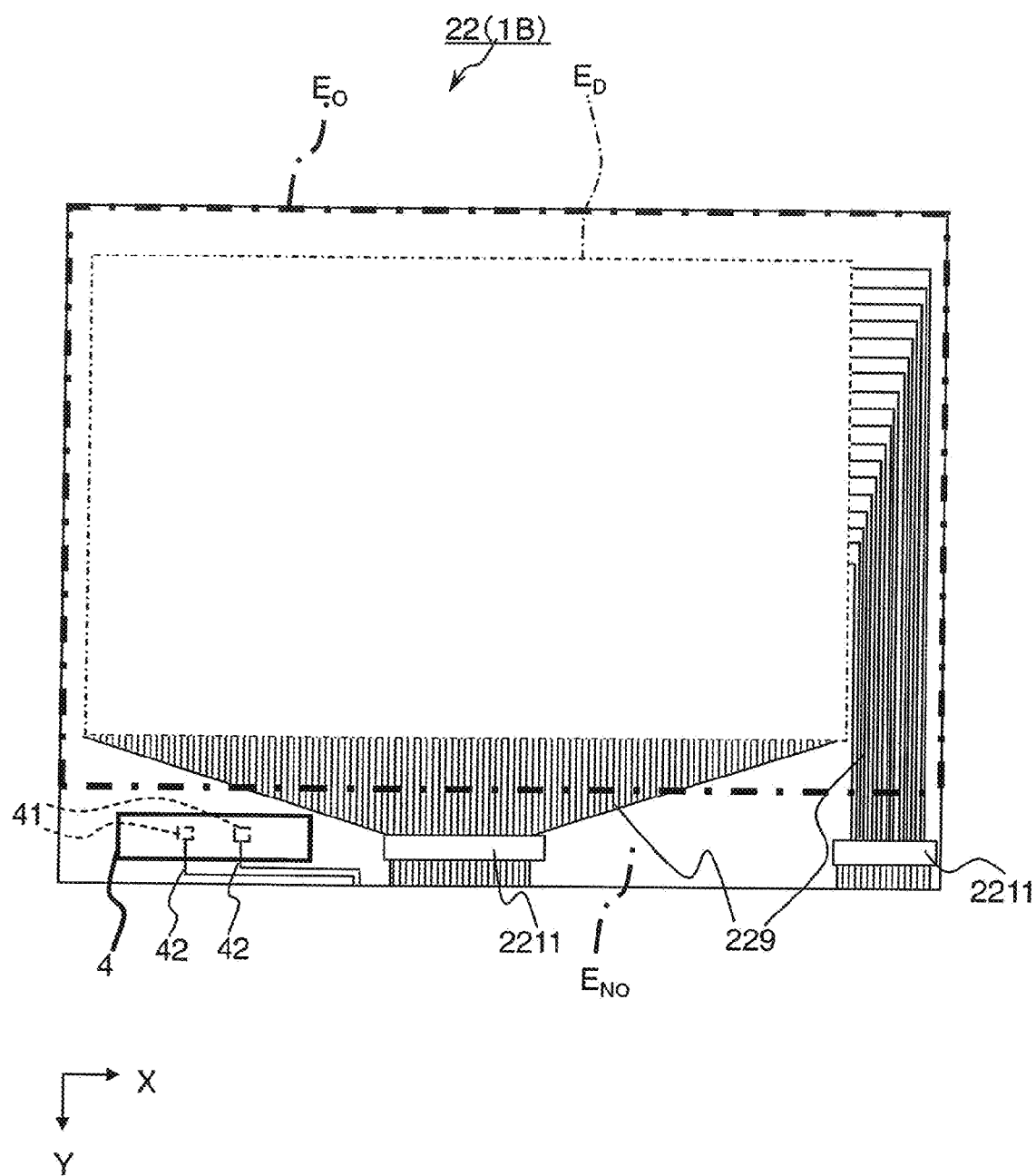
FIG. 12 is a plan view showing the second substrate, and shows a display device according to a third embodiment of the present invention.

FIG. 12 shows a display device 1B as an example of the third embodiment.

The display device 1B differs from the display device 1 with respect to the following points.

In the display device 1B, the non-facing region $E_{NO}$ is provided not along three sides of the first substrate 21, but along one side of the first substrate 21. Also, the vibrating body 4, the vibrating body interconnects 42, and the driver IC 2211 are provided in the non-facing region $E_{NO}$ along one side of the first substrate 21.

In the display device 1B, since the vibrating body 4, the vibrating body interconnects 42, and the driver IC 2211 are provided in the non-facing region $E_{NO}$ along one side of the first substrate 21, it is not necessary to provide another non-facing region $E_{NO}$ for the purpose of providing the vibrating body 4 and the vibrating body interconnects 42, thereby suppressing an increase in the size of the frame region of the display device 1B.

Fourth Embodiment

FIG. 13 shows a display device 1C of the fourth embodiment.

The display device 1C differs from the display device 1 in that the input section 3 does not include an input section substrate 31.

In the display device 1C, the detection electrodes 32 of the input region 3 are provided so as to be in contact with the first primary surface 21a of the first substrate 21. As a result, the space provided between the input section substrate 31 of the input section 3 and the first primary surface 21a of the first substrate 21 can be eliminated, and the thickness of the display device can be reduced.

Also, by eliminating the above-noted space, since the air layer existing in the space is eliminated, when external light such as sunlight and illumination light strikes the display panel 2, reflection of light at the boundary between the input section substrate 31 and the air layer and at the boundary between the air layer and the first substrate 21 is eliminated, enabling reduction of occurrence of background reflection, and improvement of the display quality.

In addition, since the input section 3 does not include an input section substrate 31, transmission of the vibration of the vibrating bodies 4 to the user is facilitated.

DESCRIPTION OF THE REFERENCE NUMERALS 1, 1A, 1B, 1C Display device
2 Display panel
21 First substrate
21a First primary surface (outer primary surface)
P Pixel
$E_D$ Display region
$E_N$ Non-display region
$E_I$ Input region
21b Second primary surface (inner primary surface)
211 Light-blocking film
212 Color filter
213 First orientation film
22 Second substrate
22a First primary surface (inner primary surface)
$E_O$ Facing region
$E_{FD}$ Display facing region
$E_{FN}$ Non-display facing region
22b Second primary surface (outer primary surface)
221 Gate interconnect
222 First insulating film
223 Source interconnect 224 Thin-film transistor
225 Second insulating film
226 Common electrode (display electrode)
227 Third insulating film
228 Signal electrode (display electrode)
229 Display interconnect
2210 Second orientation film
2211 Driver IC
23 Liquid crystal layer
24 Joining member (vibration-transmission member)
3 Input section
31 Input section substrate
32 Detection electrode
33 Detection interconnect
34 Insulator
T Sealing member
4 Vibrating body
41 Electrode terminal
42 Vibrating body interconnect
5 Light source device
51 Light source
52 Light-guiding sheet
6 First polarizing sheet
61 Adhesive
7 Second polarizing sheet
H Protective member

What is claimed is:

1. A display device comprising:
a first substrate comprising:
a first inner primary surface and an outer primary surface opposing each other;
a display region and an input region on the outer primary surface; and
an input section for detecting an input location in the input region;
a second substrate comprising a second inner primary surface, the second inner primary surface comprising:
a facing region facing the first inner primary surface; and
a non-facing region not facing the first inner primary surface;
a display part located between the first substrate and the second substrate for displaying image information in the display region;
a vibrating body located in the non-facing region on the second substrate; and
a vibration-transmission member located between the first inner primary surface and the second inner primary surface,
wherein the vibrating body is in direct contact with a side surface of the first substrate.

2. The display device according to claim 1, wherein the vibrating body is entirely located in the non-facing region.

3. The display device according to claim 1, further comprising:
a display electrode of the display part;
a display interconnect electrically connected to the display electrode; and
a vibrating body interconnect electrically connected to the vibrating body,
wherein the display electrode, the display interconnect and the vibrating body interconnect are located on the second inner primary surface, and
wherein the vibrating body interconnect comprises the same material as the display interconnect.

4. The display device according to claim 3, further comprising a driver IC connected to the display interconnect, wherein the non-facing region; is located along one side of the first substrate; and comprises the driver IC therein.

5. The display device according to claim 1, further comprising a protective member;
located on the second inner primary surface; covering the vibrating body; and being in contact with the first substrate.

6. The display device according to claim 1, wherein the input section comprises a detection part.

7. The display device according to claim 6, wherein the input section comprises:
a detection electrode; and
a detection interconnect,
wherein the detection electrode is located in the input region of the outer primary surface or the first inner primary surface, and the detection interconnect is located in a region of the outer primary surface or first inner primary surface that excludes the display region and the input region.

* * * * *